(12) United States Patent
Delfort et al.

(10) Patent No.: US 11,136,434 B2
(45) Date of Patent: Oct. 5, 2021

(54) POLYAMINES, SYNTHESIS METHOD THEREOF AND USE THEREOF FOR THE SELECTIVE ELIMINATION OF H2S FROM A GASEOUS EFFLUENT COMPRISING CO2

(71) Applicant: IFP Energies Nouvelles, Rueil-Malmaison (FR)

(72) Inventors: Bruno Delfort, Paris (FR); Thierry Huard, Saint Symphorien D'Ozon (FR); Julien Grandjean, Lyons (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 97 days.

(21) Appl. No.: 16/620,078

(22) PCT Filed: May 28, 2018

(86) PCT No.: PCT/EP2018/063969
§ 371 (c)(1),
(2) Date: Dec. 6, 2019

(87) PCT Pub. No.: WO2018/224350
PCT Pub. Date: Dec. 13, 2018

(65) Prior Publication Data
US 2020/0148824 A1 May 14, 2020

(30) Foreign Application Priority Data
Jun. 9, 2017 (FR) ...................................... 1755176

(51) Int. Cl.
*C08G 73/06* (2006.01)
*C10L 3/10* (2006.01)
*B01D 53/78* (2006.01)
*B01D 53/14* (2006.01)

(52) U.S. Cl.
CPC ..... *C08G 73/0633* (2013.01); *B01D 53/1468* (2013.01); *B01D 53/78* (2013.01); *C10L 3/103* (2013.01); *C10L 2290/541* (2013.01)

(58) Field of Classification Search
CPC .. B01D 53/1468; B01D 53/52; B01D 53/526; B01D 53/78; B01D 2252/204; B01D 2252/20415; B01D 2257/304; B01D 2258/0283; B01J 19/00; B01J 2219/00; C10L 3/103
See application file for complete search history.

(56) References Cited

U.S. PATENT DOCUMENTS

| 3,917,817 A | 11/1975 | Vanlerberghe et al. |
| 9,321,007 B2 * | 4/2016 | Rochelle ............ B01D 53/1475 |
| 9,421,492 B2 * | 8/2016 | Laroche ............... C07D 213/74 |
| 2015/0290580 A1 | 10/2015 | Grandjean et al. |

FOREIGN PATENT DOCUMENTS

| FR | 2162025 A1 | 7/1973 |
| WO | 2014/053720 A1 | 4/2014 |

OTHER PUBLICATIONS

International Search Report dated Aug. 10, 2018 issued in corresponding PCT/EP2018/063969 application (3 pages).
C. Caldo, "Syntheses and Properties of Polymers from 1-Chloro-2,3-Epoxypropane and Amines", Journal of Applied Polymer Science, vol. 29, No. 4 (Apr. 1, 1984) pp. 1393-1402.

* cited by examiner

*Primary Examiner* — Timothy C Vanoy
(74) *Attorney, Agent, or Firm* — Millen White Zelano & Branigan; Csaba Henter (57) ABSTRACT

Polyamines of formula (I), their preparation method and their use in an absorbing solution based on amines in order to selectively eliminate $H_2S$ from a gaseous effluent containing $H_2S$ and $CO_2$, which polyamines are obtained by a reaction between piperazine and an epihalohydrin or a 1,3-dihalo-2-propanol

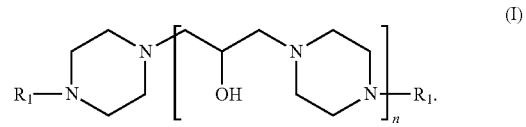

(I)

20 Claims, 4 Drawing Sheets

POLYAMINES, SYNTHESIS METHOD THEREOF AND USE THEREOF FOR THE SELECTIVE ELIMINATION OF H2S FROM A GASEOUS EFFLUENT COMPRISING CO2

FIELD OF THE INVENTION

The present invention relates to novel nitrogen-containing compounds belonging to the polyamine family, obtained from the reaction between an epihalohydrin or a 1,3-dihalo-2-propanol and piperazine. The invention also relates to the process for the synthesis of said compounds, as well as to their use in a process for deacidification of a gaseous effluent, such as gas of industrial origin or natural gas.

General Context

Absorption processes employing an aqueous solution of amines for removing acid compounds, in particular carbon dioxide ($CO_2$), hydrogen sulphide ($H_2S$), carbon oxysulphide (COS), carbon disulphide ($CS_2$), sulphur dioxide ($SO_2$) and mercaptans (RSH), present in a gas are in routine use. The gas is deacidified by contact with the absorbing solution in an absorption column ("absorber"), then the absorbing solution is thermally regenerated in a regeneration column ("regenerator"). A gas which is depleted in acid compounds is then produced in the absorber, and a gas which is rich in acid compounds leaves the regenerator. The document U.S. Pat. No. 6,852,144 describes, for example, a method for the elimination of acid compounds from hydrocarbons. The method uses a water/N-methyldiethanolamine (MDEA) or water/triethanolamine absorbing solution containing a high proportion of at least one compound belonging to the following group: piperazine, methylpiperazine and morpholine.

A limitation for absorbing solutions which are in routine use in deacidification applications is an insufficient selectivity for the absorption of $H_2S$ compared with $CO_2$. In fact, in certain cases of the deacidification of natural gas, a selective elimination of the $H_2S$ is focused upon by limiting the absorption of $CO_2$ as far as is possible. This constraint is particularly important for gases to be treated which already have a $CO_2$ content which is less than or equal to the desired specification. Thus, a maximum $H_2S$ absorption capacity with a maximum $H_2S$ absorption selectivity compared with $CO_2$ is aimed for. This selectivity means that an acid gas can be recovered from the regenerator outlet having as high a concentration of $H_2S$ as possible, which limits the size of the units of the sulphur line downstream of the treatment and ensures better operation. In certain cases, a $H_2S$ enrichment unit is necessary in order to concentrate the acid gas in $H_2S$. In this case, the absorbing solution with the best possible selectivity is also sought. The tail gas treatment units also require a selective elimination of $H_2S$, which is returned upstream of the sulphur line.

The person skilled in the art will be well aware that tertiary amines or secondary amines with a severe steric hindrance have slower $CO_2$ capture kinetics than primary amines or secondary amines which are less hindered. In contrast, tertiary amines or secondary amines with a severe steric hindrance have instantaneous $H_2S$ capture kinetics, which means that selective elimination of the $H_2S$ can be carried out on the basis of the distinct kinetic performances.

In 1950, Frazier and Kohl (Ind. and Eng. Chem., 42, 2288) in particular demonstrated that the tertiary amine which is MDEA has a high degree of absorption selectivity for $H_2S$ compared with $CO_2$ because of the distinct kinetic performances of this amine in respect of these two gases. However, there are cases in which MDEA cannot be used to obtain the desired $H_2S$ absorption capacity and in which the selectivity is insufficient. Thus, using MDEA in order to treat gases containing high partial pressures of $CO_2$ and $H_2S$, as is the case with certain natural gases, for example, is of limited interest. The case is the same when the $H_2S$ contents have to be reduced to low partial pressures, for example in the context of the treatment of refinery tail gas or synthesis gases.

The patents U.S. Pat. Nos. 4,405,581, 4,405,582 and U.S. Pat. No. 4,405,583 disclose the use of absorbing solutions based on hindered secondary amines for the selective elimination of $H_2S$ in the presence of $CO_2$. The patent U.S. Pat. No. 4,405,811 discloses the use of hindered tertiary aminoether alcohols, and the patent U.S. Pat. No. 4,483,833 discloses the use of heterocyclic aminoalcohols and aminoether alcohols in order to eliminate $H_2S$ from a gaseous mixture comprising $H_2S$ and $CO_2$. Overall, these patents describe improved performances in terms of selectivity and capacity compared with MDEA. These amines represent a very clear advantage over MDEA for applications employing gases with low partial pressures of acid gases. The use of these hindered amines, however, remains limited for higher pressures of acid gas, as is the case for the majority of natural gas treatment applications. The gains in absorption capacity may be reduced when the partial pressure of acid gas increases, and all the more so since control of the temperature in the absorber imposes a limited acid gas loading level at the bottom of the absorber. Finally, the size of the natural gas treatment units, employing several hundred tones of amine, often renders the use of a solvent based on these complex amines very expensive.

It is also well known to the person skilled in the art that the partial neutralization of a solution of MDEA by the addition of a small quantity of phosphoric or sulphuric acid or other acids or ammonium salts can be used to reduce the energy consumption at the reboiler for the regeneration of the solution of amines, or can be used to obtain lower $H_2S$ contents in the treated gas by reducing the loading level of acid compounds for the regenerated amine returned to the head of the absorber. This type of formulation is described, for example, in patent FR 2 313 968 B1 or the patent application EP 134 948 A2. The document EP 134 948 A2 indicates that this type of formulation can be used to reduce the number of trays in the absorber for a given $H_2S$ absorption specification, this reduction meaning that $CO_2$ absorption can be limited, and thus the selectivity can be improved. However, a quantification of this improvement is not indicated. Furthermore, the protonation of the amine by an acid such as that described, for example, in EP 134 948 A2, may have a negative effect in the top of the absorber where the approach to equilibrium is critical, which may in some cases result in the opposite effect and result in increasing the number of trays or increasing the flow rate of the circulating solvent (van den Brand et al, Sulphur 2002, 27-30 Oct. 2002).

The use of an organic solvent mixed with a hindered tertiary amine or secondary amine which might contain water is also known to be able to improve the absorption selectivity of $H_2S$ compared with $CO_2$, as described, for example, in patent application FR 2 485 945 or in presentations regarding the Sulfinol process (Huffmaster and Nasir, Proceedings of the 74th GPA Annual Convention. Gas Treating and Sulfur Recovery. 1995, 133). The use of organic solvent in concentrations which are typically in the range 2% to 50% (patent U.S. Pat. No. 4,085,192) or in the range 20% to 50% (patent application FR 2 485 945) provides an improvement in selectivity in the case of high pressures of acid gases. However, this advantage is counterbalanced by a higher co-absorption of the hydrocarbons. For low pressures of acid gases where the quantity of organic solvent has to be reduced in order to keep the capture level high, the gain in selectivity will also be reduced.

The document FR 2 996 464 describes that the addition of certain organic compounds, in particular added in very small quantities, to a formulation comprising water and at least one hindered tertiary or secondary amine means that the selectivity for absorption during the selective absorption of $H_2S$ as opposed to $CO_2$ of a gaseous effluent comprising $H_2S$ and $CO_2$ can be controlled. By increasing the dynamic viscosity of the aqueous solution in a controlled manner, said organic compound can be used to improve the selectivity for absorption of $H_2S$ compared with $CO_2$. The organic compounds described are, for example, polyols, polyethers, copolymers of ethylene oxide terminated by hydrophobic motifs attached to ethylene oxide groups via urethane groups, partially or completely hydrolysed polyacrylamides, polymers or copolymers comprising monomeric units of the acrylic, methacrylic, acrylamide, acrylonitrile, N-vinylpyridine, N-vinylpyrrolidinone, N-vinylimidazole, or polysaccharide type. These compounds are not amines which are susceptible of reacting with acid compounds such as $CO_2$ of the gas to be treated, as is the case with the hindered tertiary or secondary amine of the absorbing solution.

However, the inventors have discovered that the addition of viscosifying organic compounds has a variable effect on the $CO_2$ absorption kinetics which depends on the nature of the organic compound used. It thus remains difficult to predict and optimize the absorption selectivity for $H_2S$ of a gaseous effluent containing $CO_2$ by an amine absorbing solution and a viscosifying organic compound solely on the basis of viscosity.

The French patent application filed by the Applicant with Ser. No. 15/622,247 discloses, for example, polyamines which may be used as organic viscosifying compounds in absorbing solutions for the selective elimination of $H_2S$ from a gaseous effluent containing $H_2S$ and $CO_2$. These polyamines, obtained from the reaction between a polyol diglycidylether and piperazine, can be used to obtain good performances in terms of the absorption capacity for acid gases and the absorption selectivity as regards $H_2S$ when they are added to an aqueous absorbing solution of hindered tertiary or secondary amines.

DESCRIPTION OF THE INVENTION

Aims and Summary of the invention

The main aim of the present invention is to provide compounds which can be used in formulations of absorbing solutions based on amines which are employed in the deacidification of gas, for a selective elimination of $H_2S$ compared with $CO_2$, overcoming the problems of the prior art presented hereinabove.

Novel nitrogen-containing compounds belonging to the polyamine family and obtained from the reaction between an epihalohydrin or a 1,3-dihalo-2-propanol and piperazine, may advantageously be used in the field of gas deacidification.

The inventors have demonstrated that the viscosifying compounds used to limit the absorption of $CO_2$ are not equivalent in terms of performances when used in absorbing solution formulations for an industrial process for the selective elimination of $H_2S$ in gases containing $CO_2$.

The inventors have demonstrated that, unexpectedly, certain compounds belonging to a polyamine family, also known as coamines in the present description, obtained from the reaction between an epihalohydrin or a 1,3-dihalo-2-propanol and piperazine, and in particular added in small quantities to the solution of hindered tertiary or secondary amine, termed the principal amine, could be used to obtain $CO_2$ absorption rates below those obtained with an identical solution of principal amine (hindered tertiary or secondary) without said coamines, or with an identical principal amine solution viscosified by an organic non-amine compound in accordance with the prior art and with a viscosity equivalent to or higher than the principal amine solution mixed with the coamines.

The inventors have demonstrated that the use of polyamines in accordance with the general formula (I) given below, obtained from the reaction between an epihalohydrin or a 1,3-dihalo-2-propanol and piperazine, can be used to obtain good performances in terms of the absorption capacity for acid gases and absorption selectivity as regards $H_2S$, in particular an adsorption selectivity as regards $H_2S$ which is greater than reference amines such as MDEA, in particular by adding these polyamines in small quantities to solutions of the reference amine.

Thus, in a first aspect, the invention concerns a nitrogen-containing compound belonging to the polyamine family, obtained by the reaction between piperazine and an epihalohydrin or a 1,3-dihalo-2-propanol, and having the following general formula (I):

in which n is in the range 2 to 100, and each radical $R_1$ is equally either a hydrogen atom or an alkyl radical containing between 1 and 8 carbon atoms or a hydroxyalkyl radical having the following general formula (II):

in which each radical $R_2$ is equally either a hydrogen atom or an alkyl radical containing between 1 and 6 carbon atoms, and two radicals $R_2$ may be connected together via a covalent bond in order to form a cycle when said two radicals $R_2$ are alkyl radicals containing between 1 and 6 carbon atoms.

In accordance with one embodiment, all of the radicals $R_1$ are hydrogen atoms.

In accordance with another embodiment, all of the radicals $R_1$ are hydroxyalkyl radicals having general formula (II), with at least three radicals $R_2$ being hydrogen atoms.

In accordance with a second aspect, the present invention concerns a process for the synthesis of at least one nitrogen-containing compound in accordance with the invention, comprising a polycondensation reaction between piperazine with formula (III) and an epihalohydrin with general formula (IV) or a 1,3-dihalo-2-propanol with general formula (XI) in order to form at least one compound with general formula (I) in which the radical $R_1$ is a hydrogen atom (formula V), X being a halogen atom in general formulae (IV) and (XI), preferably a chlorine or bromine atom, and yet more preferably a chlorine atom.

Preferably, the epihalohydrin with general formula (IV) is epichlorohydrin, and the 1,3-dihalo-2-propanol with general formula (XI) is 1,3-dichloro-2-propanol.

Advantageously, a base, preferably sodium hydroxide or potassium hydroxide, and more preferably sodium hydroxide, is used in order to neutralize the hydrohalic acid produced during the reaction for polycondensation between piperazine and the epihalohydrin with general formula (IV) or the 1,3-dihalo-2-propanol with general formula (XI), forming a salt thereby, said salt preferably being eliminated by washing or by filtration.

The polycondensation reaction is preferably carried out at a temperature in the range from ambient temperature to 140° C.

The polycondensation reaction may be carried out in the presence of a solvent or a solvent mixture, the solvent being selected from the group constituted by water, an alcohol, and an ether, said alcohol preferably being methanol, ethanol or isopropanol, and said ether preferably being tetrahydrofuran, 1,4-dioxane or diglyme.

In accordance with a third aspect, the present invention concerns a process for the synthesis of at least one nitrogen-containing compound in accordance with the invention, comprising:
  a first polycondensation reaction between piperazine with formula (III) and an epihalohydrin with general formula (IV) or a 1,3-dihalo-2-propanol with general formula (XI) in order to form at least one compound with general formula (I) in which the radical $R_1$ is a hydrogen atom (formula V), X being a halogen atom in general formulae (IV) and (XI), preferably a chlorine or bromine atom, and yet more preferably a chlorine atom,
  a second reaction for addition or condensation of the compound with general formula (V) with a third reagent in order to produce a compound having the general formula (I) in which the radical $R_1$ is an alkyl radical containing between 1 and 8 carbon atoms or a hydroxyalkyl radical having general formula (II).

Advantageously, the second reaction is carried out between the compound with general formula (V) and an epoxide in order to produce a compound having the general formula (I) in which the radical $R_1$ is a hydroxyalkyl radical having the general formula (II).

Alternatively, the second reaction may be a condensation or addition reaction enabling N-alkylation of the compound with general formula (V) in order to produce a compound having the general formula (I) in which the radical $R_1$ is an alkyl radical containing between 1 and 8 carbon atoms.

In accordance with one embodiment, the piperazine is in molar excess with respect to the epihalohydrin with general formula (IV) or with respect to the 1,3-dihalo-2-propanol with general formula (XI).

In accordance with another embodiment, the epihalohydrin with general formula (IV) or the 1,3-dihalo-2-propanol with formula (XI) is in molar excess with respect to the piperazine, and the polycondensation reaction is furthermore carried out in the presence of a mono-N-substituted piperazine derivative with general formula (XII), with the ensemble formed by the piperazine and the mono-N-substituted piperazine derivative being in molar excess with respect to the epihalohydrin or to the 1,3-dihalo-2-propanol.

In accordance with a fourth aspect, the present invention concerns an absorbing solution for eliminating acid compounds contained in a gaseous effluent, comprising:
  (a) water,
  (b) at least one principal nitrogen-containing compound comprising at least one tertiary amine function or secondary amine function comprising two secondary carbons in the α and α' position of the nitrogen atom or at least one tertiary carbon in the alpha or beta position of the nitrogen atom, and
  (c) at least one auxiliary nitrogen-containing compound in accordance with the invention, or susceptible of being obtained by a synthesis process in accordance with the invention.

Preferably, the solution comprises:
  a fraction by weight of water in the range 3.5% to 94.5% by weight of the absorbing solution, preferably in the range 39.5% to 79.5% by weight,
  a fraction by weight of the principal nitrogen-containing compound in the range 5% to 95% by weight of the absorbing solution, preferably in the range 20% to 60% by weight,
  a fraction by weight of the auxiliary nitrogen-containing compound in the range 0.5% to 25% by weight of the absorbing solution, preferably in the range 1% to 10% by weight,
  the fraction by weight of the principal nitrogen-containing compound being higher than that of the auxiliary nitrogen-containing compound.

The principal nitrogen-containing compound may be selected from the group constituted by:
  N-methyldiethanolamine;
  triethanolamine;
  diethylmonoethanolamine;
  dimethylmonoethanolamine;
  ethyldiethanolamine;
  tertiary monoalkanolamines of the family of 3-alkoxypropylamines from the list constituted by N-methyl-N-(3-methoxypropyl)-2-aminoethanol, N-methyl-N-(3- methoxypropyl)-1-amino-2-propanol, N-methyl-N-(3-methoxypropyl)-1-amino-2-butanol, N-ethyl-N-(3-methoxypropyl)-2-aminoethanol, N-ethyl-N-(3-methoxypropyl)-1-amino-2-propanol, N-ethyl-N-(3-methoxypropyl)-1-amino-2-butanol, N-isopropyl-N-(3-methoxypropyl)-2-aminoethanol, N-isopropyl-N-(3-methoxypropyl)-1-amino-2-propanol, and N-isopropyl-N-(3-methoxypropyl)-1-amino-2-butanol;

diamines from the list constituted by 1,2-bis(2-dimethylaminoethoxy)ethane, 1,2-bis(2-diethylaminoethoxy)ethane and 1,2-bis(2-pyrolidinoethoxy)ethane;

diamines of the 1,3-diamino-2-propanol family from the list constituted by 1,3-bis(dimethylamino)-2-propanol, (1-dimethylamino-3-tert-butylamino)-2-propanol, 1,3-bis(tert-butylamino)-2-propanol, 1,3-bis(diethylamino)-2-propanol, 1,3-bis(methylamino)-2-propanol, 1,3-bis(ethylmethylamino)-2-propanol, 1,3-bis(n-propylamino)-2-propanol, 1,3-bis(isopropylamino)-2-propanol, 1,3-bis(n-butylamino)-2-propanol, 1,3-bis(isobutylamino)-2-propanol, 1,3-bis(piperidino)-2-propanol, 1,3-bis(pyrrolidino)-2-propanol and N,N,N'-trimethyl-N'-hydroxyethyl-1,3-diamino-2-propanol;

dihydroxyalkylamines from the list constituted by N-(2'-hydroxyethyl)-2-amino-2-methyl-1-propanol, N-(2'-hydroxypropyl)-2-amino-2-methyl-1-propanol, N-(2'-hydroxybutyl)-2-amino-2-methyl-1-propanol, (N-methyl-N-hydroxyethyl)-3-amino-2-butanol;

diamines of the family of bis(amino-3-propyl)ethers or (amino-2-ethyl)-(amino-3-propyl)ethers from the list constituted by bis(dimethylamino-3-propyl)ether, bis(diethylamino-3-propyl) ether, (dimethylamino-2-ethyl)-(dimethylamino-3-propyl) ether, (diethylamino-2-ethyl)-(dimethylamino-3-propyl) ether, (dimethylamino-2-ethyl)-(diethylamino-3-propyl) ether, (diethylamino-2-ethyl)-(diethylamino-3-propyl) ether;

beta-hydroxylated tertiary diamines from the list constituted by 1-dimethylamino-3-(2-dimethylaminoethoxy)-2-propanol, 1,1'-oxybis[3-(dimethylamino)-2-propanol], N,N,N',N'-(tetramethyl)-1,6-diamino-2,5-hexanediol, N,N,N',N'-(tetramethyl)-1,7-diamino-2,6-heptanediol, N,N,N',N'-(tetramethyl)-1,8-diamino-2,7-octanediol, N,N,N',N'-(tetramethyl)-1,9-diamino-2,8-nonanediol, N,N,N',N'-(tetramethyl)-1,10-diamino-2,9-decanediol;

di-(2-hydroxyalkyl) monoamines from the list constituted by 1-[(2-hydroxyethyl)methylamino]-2-methyl-2-propanol, 1,1'-(methylimino)-bis-[2-methyl-2-propanol], 2-[2-hydroxy-2-methylpropyl)amino]-2-methyl-1-propanol, 2-[(2-hydroxy-2-methylpropyl)amino]-1-butanol, bis(2-hydroxy-2-methylpropyl)amine;

hindered tertiary 4-(aminoethyl)-morpholines from the list constituted by 1-(4-morpholino)-2-(methylisopropylamino) ethane, 1-(4-morpholino)-2-(methyltert-butylamino) ethane, 1-(4-morpholino)-2-(diisopropylamino) ethane, 1-(4-morpholino)-2-(1-piperidinyl) ethane;

diamines from the list constituted by (N-morpholinoethyl) isopropylamine, (N-piperidinoethyl) isopropylamine, (N-morpholinoethyl) tertiobutylamine;

amines from the family of N-alkyl-3-hydroxypiperidines and N-alkyl-4-hydroxypiperidines from the list constituted by N-methyl-4-hydroxypiperidine, N-ethyl-3-hydroxypiperidine, N-methyl-3-hydroxypiperidine;

alkylaminopiperazines, namely 1-methyl-4-(3-dimethylaminopropyl) piperazine, 1-ethyl-4-(diethylaminoethyl) piperazine.

The absorbing solution may furthermore comprise a physical solvent selected from the group constituted by methanol, ethanol, 2-ethoxyethanol, benzyl alcohol, triethyleneglycol dimethylether, tetraethyleneglycol dimethylether, pentaethyleneglycol dimethylether, hexaethyleneglycol dimethylether, heptaethyleneglycol dimethylether, octaethyleneglycol dimethylether, diethyleneglycol butoxyacetate, glycerol triacetate, sulpholane, N-methylpyrrolidone, N-methylmorpholin-3-one, N,N-dimethylformamide, N-formyl-morpholine, N,N-dimethyl-imidazolidin-2-one, N-methylimidazole, ethyleneglycol, diethyleneglycol, triethyleneglycol, thiodiglycol, tributylphosphate, and propylene carbonate.

In accordance with a fifth aspect, the present invention concerns a process for the selective elimination of $H_2S$ compared with $CO_2$ from a gaseous effluent comprising $H_2S$ and $CO_2$, in which a step for the absorption of acid compounds is carried out by bringing the gaseous effluent into contact with an absorbing solution in accordance with the invention.

The gaseous effluent is advantageously selected from natural gas, synthesis gases, refinery gases, acid gases obtained from an amines unit, gases obtained from a Claus process tail reduction unit, and biomass fermentation gases.

Other aims and advantages of the invention will become apparent from the following description of examples of particular embodiments of the invention, given by way of non-limiting examples; the description will also make reference to the accompanying figures described below.

BRIEF DESCRIPTION OF THE FIGURES

In the figures illustrating the preparation of the nitrogen-containing compounds in accordance with the invention, the arrows represent the steps of the reaction. These are reaction schemes. The illustrations of the synthesis process in accordance with the invention do not include all of the components which are necessary in order to carry it out. Only the elements necessary for comprehension of the invention are shown therein; the person skilled in the art will be capable of completing this representation in order to carry out the invention.

DETAILED DESCRIPTION OF THE INVENTION

The novel nitrogen-containing compounds in accordance with the invention are polyamines obtained from the reaction between an epihalohydrin or a 1,3-dihalo-2-propanol and piperazine, and having the following general formula (I):

(I)

in which:
  n is in the range 2 to 100,
  each radical $R_1$ is equally either a hydrogen atom or an alkyl radical containing between 1 and 8 carbon atoms or a hydroxyalkyl radical having the following general formula (II):

(II)

in which:
  each radical $R_2$ is equally either a hydrogen atom or an alkyl radical containing between 1 and 6 carbon atoms,
  two radicals $R_2$ may be connected together via a covalent bond in order to form a cycle when said two radicals $R_2$ are alkyl radicals containing between 1 and 6 carbon atoms.

In accordance with one preferred embodiment, all of the radicals $R_1$ are hydrogen atoms.

In accordance with another preferred embodiment, all of the radicals $R_1$ are hydroxyalkyl radicals having general formula (II), in which at least three radicals $R_2$ are hydrogen atoms.

Preferably, n is in the range 4 to 100, and more preferably in the range 4 to 50.

In the present description, the term "alkyl radical" means a linear hydrocarbon chain.

The term "hydroxyalkyl radical" means a linear hydrocarbon chain comprising a hydroxy group.

Synthesis of a Compound in Accordance with the Invention

The nitrogen-containing compounds having the general formula (I) may be synthesised using any pathway which is allowable in organic chemistry.

Advantageously, the synthesis of the compounds of the invention is based on a first polycondensation reaction between piperazine and an epihalohydrin, preferably epichlorohydrin, or between piperazine and a 1,3-dihalo-2-propanol, preferably 1,3-dichloro-2-propanol.

Two principal synthesis embodiments may be used to obtain the compounds having the general formula (I).

Synthesis of a compound in accordance with the invention, in accordance with a first embodiment: synthesis pathways A1 (FIG. 2) and A2 (FIG. 3):

This first synthesis embodiment comprises a polycondensation reaction between piperazine with formula (III) and an epihalohydrin with formula (IV), preferably epichlorohydrin (pathway A1 illustrated in FIG. 2), or a 1,3-dihalo-2-propanol with formula (XI), preferably 1,3-dichloro-2-propanol (pathway A2 illustrated in FIG. 3), in order to form at least one compound having the general formula (I) in which the radical $R_1$ is a hydrogen atom, or a compound with general formula (V).

Figure 2:
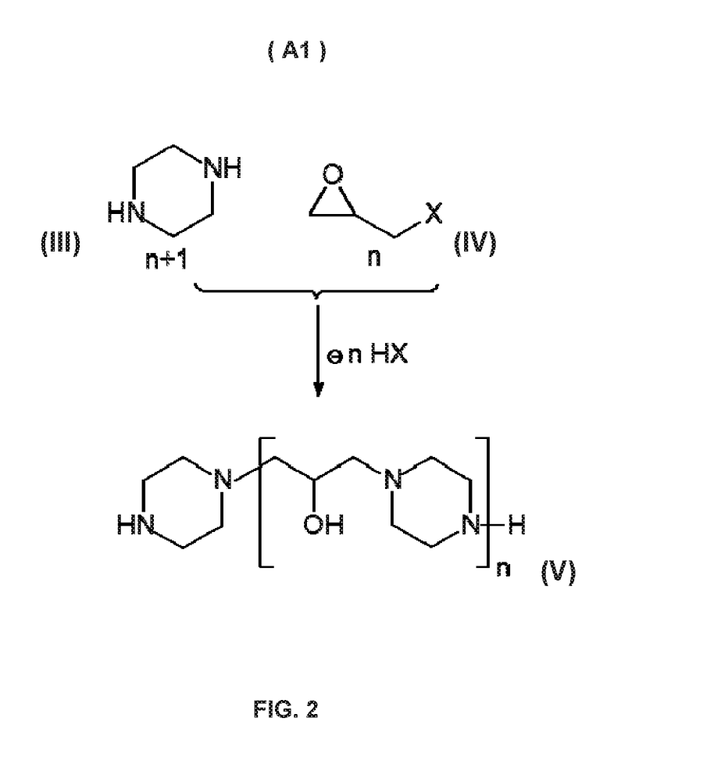
FIG. 2 illustrates a synthesis pathway for a compound in accordance with the invention, in accordance with a first synthesis embodiment.
Figure 3:
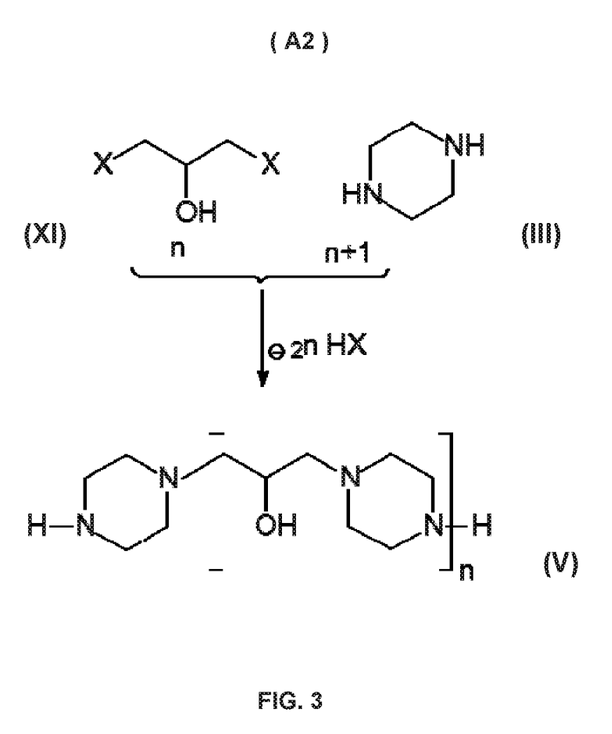
FIG. 3 illustrates another pathway for the synthesis of a compound in accordance with the invention in accordance with the first synthesis embodiment.

The formulae (III), (IV), (XI) and (V) are as follows:

(III)

(IV)

(XI)

(V)

In formula (IV) for the epihalohydrin, X is a halogen atom, preferably a chlorine or bromine atom, and yet more preferably a chlorine atom. In this more preferred case, the epihalohydrin is epichlorohydrin.

In formula (XI) for the 1,3-dihalo-2-propanol, X a halogen atom, preferably a chlorine or bromine atom, and yet more preferably a chlorine atom. In this case, the 1,3-dihalo-2-propanol is 1,3-dichloro-2-propanol or 1,3-dibromo-2-propanol, and more preferably 1,3-dichloro-2-propanol.

The polycondensation reaction between piperazine with formula (III) and the epihalohydrin with formula (IV) is illustrated in FIG. 2 (pathway A1), and that between the piperazine with formula (III) and the 1,3-dihalo-2-propanol with formula (XI) is illustrated in FIG. 3 (pathway A2).

These polycondensation reactions between piperazine and an epihalohydrin or a 1,3-dihalo-2-propanol are preferably carried out with a calculated molar excess of piperazine (as an example, n+1 moles of piperazine for n moles of epihalohydrin or n moles of 1,3-dihalo-2-propanol in FIGS. 2 and 3), in a manner such as to obtain, as is preferable, a polymer with chain ends having secondary amine functions.

Pathway A1

In accordance with pathway A1, the polycondensation reaction produces one mole of hydrohalic acid (symbolized by HX in FIG. 2), for example hydrochloric acid when epichlorohydrin is used. This acid is neutralized by a base, for example sodium hydroxide or potassium hydroxide, in order to produce a salt. When sodium hydroxide and epichlorohydrin are used, for example, the salt by-product obtained is one mole of sodium chloride per mole of epichlorohydrin used. At the end of the operation, the salt is eliminated, for example by washing or by filtration.

The reaction is preferably carried out at a temperature in the range from ambient temperature to 140° C. The reaction may be carried out in the absence or in the presence of a solvent or a mixture of solvents. When a solvent is used, it may, in a non-exhaustive manner, be water, an alcohol such as methanol, ethanol, isopropanol, an ether such as tetrahydrofuran, 1,4-dioxane, diglyme, or any compound which can advantageously dissolve the reagents and the products of the reaction.

The intermediate products in the reaction between piperazine and the epihalohydrin as illustrated in FIG. 2 and described above are not mentioned. It is an overall reaction scheme with the starting reagents (piperazine and the epihalohydrin) and the final products (compounds with general formula (V)).

Without going into exhaustive detail as regards the reactions and intermediate products, it should be mentioned that one secondary amine function of the piperazine can react with the epihalohydrin in order to produce a halohydrin with formula (VI), for example a chlorohydrin. The chlorohydrin can: 1) either, under the action of a base such as sodium hydroxide, for example (⊕) NaOH in FIG. 3), result in a compound with formula (VII) comprising a glycidyl function by cyclization, releasing one molecule of sodium chloride (θ NaX in FIG. 4). In this case, the epoxy function generated in situ can react with a secondary amine function of a piperazine molecule in order to produce a 1,3-diamino-2-propanol structure with formula (VIII) (pathway (a) in FIG. 4); (2) or react directly with a secondary amine function of a molecule of piperazine in order to produce a 1,3-diamino-2-propanol structure with formula (VIII) (pathway (b) in FIG. 4).

Figure 4:
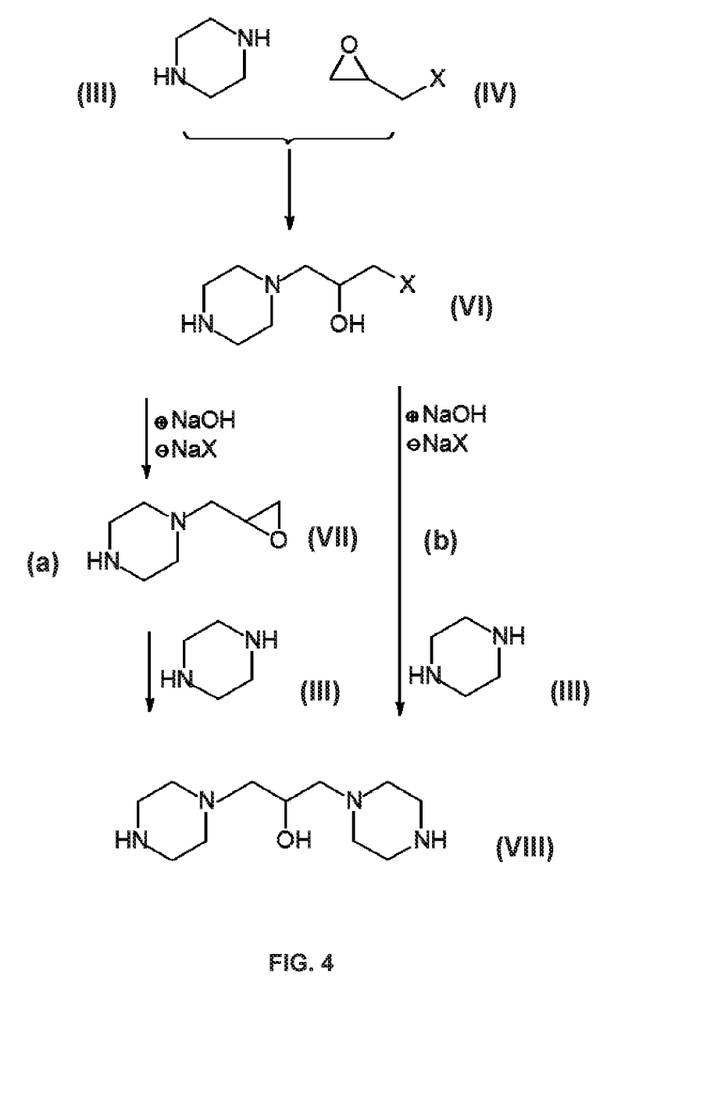
FIG. 4 illustrates intermediate reactions during the synthesis of a compound in accordance with the invention in accordance with the first synthesis embodiment.

These intermediate reactions are illustrated in FIG. 4.

The formulae (VI), (VII), (VIII) are as follows:

These reactions may take place on the two secondary amine functions of the piperazine, in which case there may be intermediate products such as the dihalohydrin with formula (IX) or the diglycidyl with formula (X), as well as any mixed products or oligomers permitted by organic chemistry. These reactions continue until compounds having the general formula (V) are obtained.

The formulae (IX) and (X) are as follows:

Pathway A2

In accordance with the pathway A2, the polycondensation reaction produces two moles of hydrohalic acid (symbolised by HX in FIG. 3), for example hydrohalic acid when 1,3-dichloro-2-propanol is used. This acid is neutralized by a base, for example sodium hydroxide or potassium hydroxide, in order to produce a salt. When sodium hydroxide and 1,3-dichloro-2-propanol are used, for example, two moles of sodium chloride per mole of 1,3-dichloro-2-propanol used are obtained. At the end of the operation, the salt is eliminated, for example by washing or by filtration.

The reaction is preferably carried out at a temperature in the range from ambient temperature to 140° C. The reaction may be carried out in the absence or in the presence of a solvent or a mixture of solvents. When a solvent is used, it may, in a non-exhaustive manner, be water, an alcohol such as methanol, ethanol, or isopropanol, an ether such as tetrahydrofuran, 1,4-dioxane, diglyme, or any compound which can advantageously dissolve the reagents and the products of the reaction.

Although these polycondensation reactions between piperazine and an epihalohydrin or a 1,3-dihalo-2-propanol are preferably carried out with a molar excess of piperazine in the overall reaction balance, as mentioned above, it is alternatively possible to carry them out with a calculated molar excess of epihalohydrin or 1,3-dihalo-2-propanol with respect to the piperazine. In this case, the polycondensation reaction is carried out in the presence of a mono-N-substituted piperazine derivative with general formula (XII) below, which guarantees the terminations for the chains of compounds with general formula (I).

The mono-N-substituted piperazine derivative with formula (XII) may be present from the beginning of the reaction between the piperazine and the epihalohydrin or the 1,3-dihalo-2-propanol, or introduced during the reaction, or in fact introduced after the reaction in a second step.

In accordance with this variation, the ensemble formed by the piperazine and the mono-N-substituted piperazine derivative are in molar excess with respect to the other starting reagents, i.e. the epihalohydrin or the 1,3-dihalo-2-propanol.

Synthesis of a Compound in Accordance with the Invention, in Accordance with a Second Embodiment This second synthesis embodiment may be used to obtain compounds with general formula (I) in which the radical $R_1$ is other than a hydrogen atom, i.e. when the radical $R_1$ is an alkyl radical containing in the range 1 to 8 carbon atoms or a hydroalkyl radical with general formula (II) as described above.

This second synthesis embodiment comprises:

a first polycondensation reaction as described for the pathways A1 and A2 of the first synthesis embodiment, i.e. a polycondensation reaction between piperazine with formula (III) and an epihalohydrin with formula (IV), preferably epichlorohydrin (pathway A1 illustrated in FIG. 2), or a 1,3-dihalo-2-propanol with formula (XI), preferably 1,3-dichloro-2-propanol (pathway A2 illustrated in FIG. 3), in order to form at least one compound having general formula (I) in which the radical $R_1$ is a hydrogen atom, or a compound with general formula (V), and a second reaction for addition or condensation of the compound with general formula (V) with a third reagent in order to produce a compound having general formula (I) in which the radical $R_1$ is other than a hydrogen atom, i.e. in which, in accordance with the definition for the general formula (I), the radical $R_1$ is an alkyl radical containing between 1 and 8 carbon atoms or a hydroxyalkyl radical having general formula (II).

In accordance with this second synthesis embodiment, the first reaction is carried out in an identical manner to that described for the pathways A1 and A2 of the first synthesis embodiment.

In accordance with this second synthesis embodiment, the third reagent of the second reaction which reacts with the compound with general formula (V) may, without being exhaustive, be an epoxide, an alkyl halide, an alcohol, or an alkene.

More precisely, when the radical $R_1$ in the general formula (I) for the compound produced is a hydroxyalkyl radical having general formula (II), the second reaction is carried out between the compound with general formula (V) and an epoxide.

When the radical $R_1$ in the general formula (I) of the compound which is produced is an alkyl radical containing between 1 and 8 carbon atoms, the second reaction is a condensation or addition reaction enabling N-alkylation of the compound with general formula (V), this type of reaction being well known to the person skilled in the art. Without being exhaustive, it may be a condensation reaction with an alkyl halide, or a condensation reaction with an alcohol, or in fact an addition reaction onto an alkene.

In all of the synthesis embodiments described, the molar mass or the degree of polymerisation of the compound having the general formula (I) depends on the molar ratio between the reagents, namely piperazine, the epihalohydrin or the 1,3-dihalo-2-propanol, or in fact the mono-N-substituted piperazine derivative.

In general, the steps of the various synthesis embodiments are carried out under conditions which are suitable for the described reactions, i.e. the conditions for carrying out said chemical reaction, which generally comprise a given reaction medium and given operating conditions (reaction time, temperature, catalysts etc.).

Other steps aimed, for example, at eliminating certain unwanted compounds, such as steps for filtration, distillation, drying, etc., may also be carried out in the various synthesis embodiments described without in any way departing from the scope of the present invention.

Use of Compounds in Accordance with the Invention in the Treatment of Gaseous Effluents The compounds in accordance with the invention may be used in various fields of chemistry, and may advantageously be used in the field of the treatment of gas of industrial origin and natural gas.

The present invention proposes carrying out a selective elimination of $H_2S$ compared with $CO_2$ of a gaseous effluent comprising $H_2S$ and $CO_2$, by using an aqueous solution comprising a principal amine and at least one nitrogen-containing compound having general formula (I). The solution is brought into contact with the gaseous effluent in order to selectively eliminate the $H_2S$ that it contains.

The use of polyamines in accordance with the invention means that, in association with a hindered tertiary or secondary principal amine, good performances can be obtained in terms of selectivity of absorption of $H_2S$ compared with $CO_2$, in particular a higher selectivity than with reference aqueous amine solutions such as N-methyldiethanolamine (MDEA), for an equivalent or higher cyclic capacity for absorption of acid gases, in particular $H_2S$.

The process comprises a step for absorption of the acid compounds by bringing the gaseous effluent into contact with an absorbing solution comprising:
(a) water,
(b) at least one principal nitrogen-containing compound comprising at least one tertiary amine function or secondary amine function comprising two secondary carbons in the $\alpha$ and $\alpha'$ position of the nitrogen atom or at least one tertiary carbon in the alpha or beta position of the nitrogen atom, and
(c) at least one auxiliary nitrogen-containing compound in accordance with general formula (I).

Reference will also be made to the expression "hindered secondary amine function" to designate a secondary amine function of a nitrogen-containing compound comprising two secondary carbons in the position $\alpha$ and $\alpha'$ to the nitrogen atom or at least one tertiary carbon in the alpha or beta position to the nitrogen atom.

Here, a tertiary carbon is defined as being a carbon atom bonded to three carbon atoms, and a secondary carbon atom is defined as being a carbon atom bonded to two carbon atoms.

The term "principal nitrogen-containing compound" or "principal amine" means the nitrogen-containing compound comprising at least one hindered tertiary amine or secondary amine function which does not have the general formula (I). The concentration by weight of the principal compound in the absorbing solution is higher than that of the auxiliary nitrogen-containing compound in accordance with the general formula (I). It should be understood that in the case in which there are a plurality of nitrogen-containing compounds, principal and/or auxiliary, it is the total concentration by weight of said principal nitrogen-containing compounds which is higher than the (total) concentration by weight of auxiliary nitrogen-containing compound(s).

The term "auxiliary nitrogen-containing compound" means the polyamine having general formula (I) obtained by reaction between a polyol diglycidylether and piperazine as described above. The auxiliary nitrogen-containing compound in accordance with the general formula (I) is also known as a coamine in the present description. The auxiliary nitrogen-containing compound has a total concentration by weight which is lower than that of the principal nitrogen-containing compound, and has a viscosifying effect, i.e. it has the effect of increasing the dynamic viscosity of the absorbing solution compared with the same solution in said auxiliary nitrogen-containing compound.

Adding coamines, in particular in small quantities, to an aqueous absorbing solution of a principal amine as defined above means that the absorption of $CO_2$ can be limited, more precisely the rate of absorption of $CO_2$, during contact with the gas to be deacidified, and thus the selective elimination of $H_2S$ compared with $CO_2$ can be improved.

Composition of the Absorbing Solution

The absorbing solution preferably comprises:
a fraction by weight of coamine with general formula (I) in the range 0.5% to 25% by weight of the absorbing solution, preferably in the range 1% to 10% by weight,
a fraction by weight of principal amine in the range 5% to 95% by weight of the absorbing solution, preferably in the range 20% to 60% by weight,
a fraction by weight of water in the range 3.5% to 94.5% by weight of the absorbing solution, preferably in the range 39.5% to 79.5% by weight, the fraction by weight of the principal amine being higher than that of the polyamines with general formula (I).

If the absorbing solution comprises a plurality of principal amines and/or a plurality of coamines, the ranges of concentration given make reference to the total concentration of principal amines and to the total concentration of coamines.

The ranges of concentration given should be understood to include the limits.

Unless otherwise indicated, the concentrations of the various compounds are expressed as a percentage by weight of the absorbing solution in the present description.

The sum of the fractions by weight, expressed as the % by weight of the various compounds of the absorbing solution, is equal to 100% by weight of the absorbing solution.

Preferably, the principal nitrogen-containing compound is selected from the group constituted by:
N-methyldiethanolamine;
triethanolamine;
diethylmonoethanolamine;
dimethylmonoethanolamine;
ethyldiethanolamine;
tertiary monoalkanolamines of the family of 3-alkoxypropylamines from the list constituted by N-methyl-N-(3-methoxypropyl)-2-aminoethanol, N-methyl-N-(3-methoxypropyl)-1-amino-2-propanol, N-methyl-N-(3-methoxypropyl)-1-amino-2-butanol, N-ethyl-N-(3-methoxypropyl)-2-aminoethanol, N-ethyl-N-(3-methoxypropyl)-1-amino-2-propanol, N-ethyl-N-(3-methoxypropyl)-1-amino-2-butanol, N-isopropyl-N-(3-methoxypropyl)-2-aminoethanol, N-isopropyl-N-(3-methoxypropyl)-1-amino-2-propanol, and N-isopropyl-N-(3-methoxypropyl)-1-amino-2-butanol;
diamines from the list constituted by 1,2-bis(2-dimethylaminoethoxy)ethane, 1,2-bis(2-diethylaminoethoxy)ethane and 1,2-bis(2-pyrolidinoethoxy)ethane;
diamines from the 1,3-diamino-2-propanol family from the list constituted by 1,3-bis(dimethylamino)-2-propanol, (1-dimethylamino-3-tert-butylamino)-2-propanol, 1,3-bis(tert-butylamino)-2-propanol, 1,3-bis(diethylamino)-2-propanol, 1,3-bis(methylamino)-2-propanol, 1,3-bis(ethylmethylamino)-2-propanol, 1,3-bis(n-propylamino)-2-propanol, 1,3-bis(isopropylamino)-2-propanol, 1,3-bis(n-butylamino)-2-propanol, 1,3-bis(isobutylamino)-2-propanol, 1,3-bis(piperidino)-2-propanol, 1,3-bis(pyrrolidino)-2-propanol and N,N,N'-trimethyl-N'-hydroxyethyl-1,3-diamino-2-propanol;
dihydroxyalkylamines from the list constituted by N-(2'-hydroxyethyl)-2-amino-2-methyl-1-propanol, N-(2'-hydroxypropyl)-2-amino-2-methyl-1-propanol, N-(2'-hydroxybutyl)-2-amino-2-methyl-1-propanol, (N-methyl-N-hydroxyethyl)-3-amino-2-butanol;
diamines of the family of bis(amino-3-propyl)ethers or (amino-2-ethyl)-(amino-3-propyl)ethers from the list constituted by bis(dimethylamino-3-propyl)ether, bis(diethylamino-3-propyl) ether, (dimethylamino-2-ethyl)-(dimethylamino-3-propyl) ether, (diethylamino-2-ethyl)-(dimethylamino-3-propyl) ether, (dimethylamino-2-ethyl)-(diethylamino-3-propyl) ether, (diethylamino-2-ethyl)-(diethylamino-3-propyl) ether;
beta-hydroxylated tertiary diamines from the list constituted by 1-dimethylamino-3-(2-dimethylaminoethoxy)-2-propanol, 1,1'-oxybis[3-(dimethylamino)-2-propanol], N,N,N',N'-(tetramethyl)-1,6-diamino-2,5-hexanediol, N,N,N',N'-(tetramethyl)-1,7-diamino-2,6-heptanediol, N,N,N',N'-(tetramethyl)-1,8-diamino-2,7-octanediol, N,N,N',N'-(tetramethyl)-1,9-diamino-2,8-nonanediol, N,N,N',N'-(tetramethyl)-1,10-diamino-2,9-decanediol;
di-(2-hydroxyalkyl) monoamines from the list constituted by 1-[2-hydroxyethyl)methylamino]-2-methyl-2-propanol, 1,1'-(methylimino)-bis-[2-methyl-2-propanol], 2-[(2-hydroxy-2-methylpropyl)amino]-2-methyl-1-propanol, 2-[(2-hydroxy-2-methylpropyl)amino]-1-butanol, bis(2-hydroxy-2-methylpropyl)amine;
hindered tertiary 4-(aminoethyl)-morpholines from the list constituted by 1-(4-morpholino)-2-(methylisopropylamino) ethane, 1-(4-morpholino)-2-(methyltert-butylamino) ethane, 1-(4-morpholino)-2-(diisopropylamino) ethane, 1-(4-morpholino)-2-(1-piperidinyl) ethane;
diamines from the list constituted by (N-morpholinoethyl) isopropylamine, (N-piperidinoethyl) isopropylamine, (N-morpholinoethyl) tert-butylamine;
amines from the family of N-alkyl-3-hydroxypiperidines and N-alkyl-4-hydroxypiperidines from the list constituted by N-methyl-4-hydroxypiperidine, N-ethyl-3-hydroxypiperidine, N-methyl-3-hydroxypiperidine;
alkylaminopiperazines, namely 1-methyl-4-(3-dimethylaminopropyl) piperazine, 1-ethyl-4-(diethylaminoethyl) piperazine.

In accordance with one embodiment, the absorbing solution may contain organic compounds which are not reactive as regards the acid compounds (conventionally known as "physical solvents"), which can be used to increase the solubility of at least one or more of the acid compounds of the gaseous effluent. As an example, the absorbing solution may comprise in the range 5% to 50% by weight of physical solvent such as alcohols, ethers, ether alcohols, glycol ethers and polyethyleneglycol, glycol thioethers, glycol and polyethyleneglycol esters and alkoxyesters, glycerol esters, lactones, lactams, N-alkylated pyrrolidones, derivatives of morpholine, of morpholin-3-one, imidazoles and imidazolidinones, N-alkylated piperidones, cyclotetramethylenesulphones, N-alkylformamides, N-alkylacetamides, ether-ketones, alkyl carbonates or alkyl phosphates, and their derivatives.

By way of non-limiting example, it may be methanol, ethanol, 2-ethoxyethanol, benzyl alcohol, triethyleneglycol dimethylether, tetraethyleneglycol dimethylether, pentaethyleneglycol dimethylether, hexaethyleneglycol dimethylether, heptaethyleneglycol dimethylether, octaethyleneglycol dimethylether, diethyleneglycol butoxyacetate, glycerol triacetate, sulpholane, N-methylpyrrolidone, N-methylmorpholin-3-one, N,N-dimethylformamide, N-formyl-morpholine, N,N-dimethyl-imidazolidin-2-one, N-methylimidazole, ethyleneglycol, diethyleneglycol, triethyleneglycol, thiodiglycol, propylene carbonate, tributylphosphate.

Nature of the Gaseous Effluents

The absorbing solutions comprising at least one nitrogen-containing compound in accordance with the invention may be employed to deacidify the following gaseous effluents: natural gas, synthesis gases, refinery gases, acid gases obtained from an amines unit, gases obtained from a Claus process tail reduction unit, or biomass fermentation gases. These gaseous effluents contain one or more of the following acid compounds: $CO_2$, $H_2S$, mercaptans (for example methylmercaptan ($CH_3SH$), ethylmercaptan ($CH_3CH_2SH$), propylmercaptan ($CH_3CH_2CH_2SH$)), COS, $CS_2$, $SO_2$.

The deacidification process using the compounds in accordance with the invention may, for example, be employed in order to deacidify a synthesis gas. The synthesis gas contains carbon monoxide CO, hydrogen $H_2$ (generally in a $H_2/CO$ ratio equal to 2), steam (generally saturated at the temperature at which the washing is carried out) and $CO_2$ (of the order of ten percent). The pressure is generally in the range 20 to 30 bar, but it may reach 70 bar. It may also contain sulphur-containing impurities ($H_2S$, COS, etc.), nitrogen-containing impurities ($NH_3$, HCN) and halogenated impurities.

The deacidification process using the compounds in accordance with the invention may also be carried out in order to deacidify a natural gas. The natural gas is mainly constituted by gaseous hydrocarbons, but may contain several of the following acid compounds: $CO_2$, $H_2S$, mercaptans, COS, $CS_2$. The content of these acid compounds may vary widely and may be up to 70% by volume for $CO_2$ and up to 40% by volume for $H_2S$. The temperature of the natural gas may be in the range 20° C. to 100° C. The pressure of the natural gas to be treated may be in the range 10 to 200 bar. The invention may be carried out in order to comply with the specifications generally imposed on the deacidified gas, which are less than 2% $CO_2$, less than 4 ppm $H_2S$, and less than 50 ppm, or even less than 10 ppm by volume of total sulphur.

Process for the Elimination of Acid Compounds in a Gaseous Effluent

The process for the selective elimination of $H_2S$ from a gaseous effluent containing $CO_2$ comprises a step for absorption of the acid compounds, namely $H_2S$ and $CO_2$, by bringing the gaseous effluent into contact with an absorbing solution in accordance with the invention.

Figure 1:
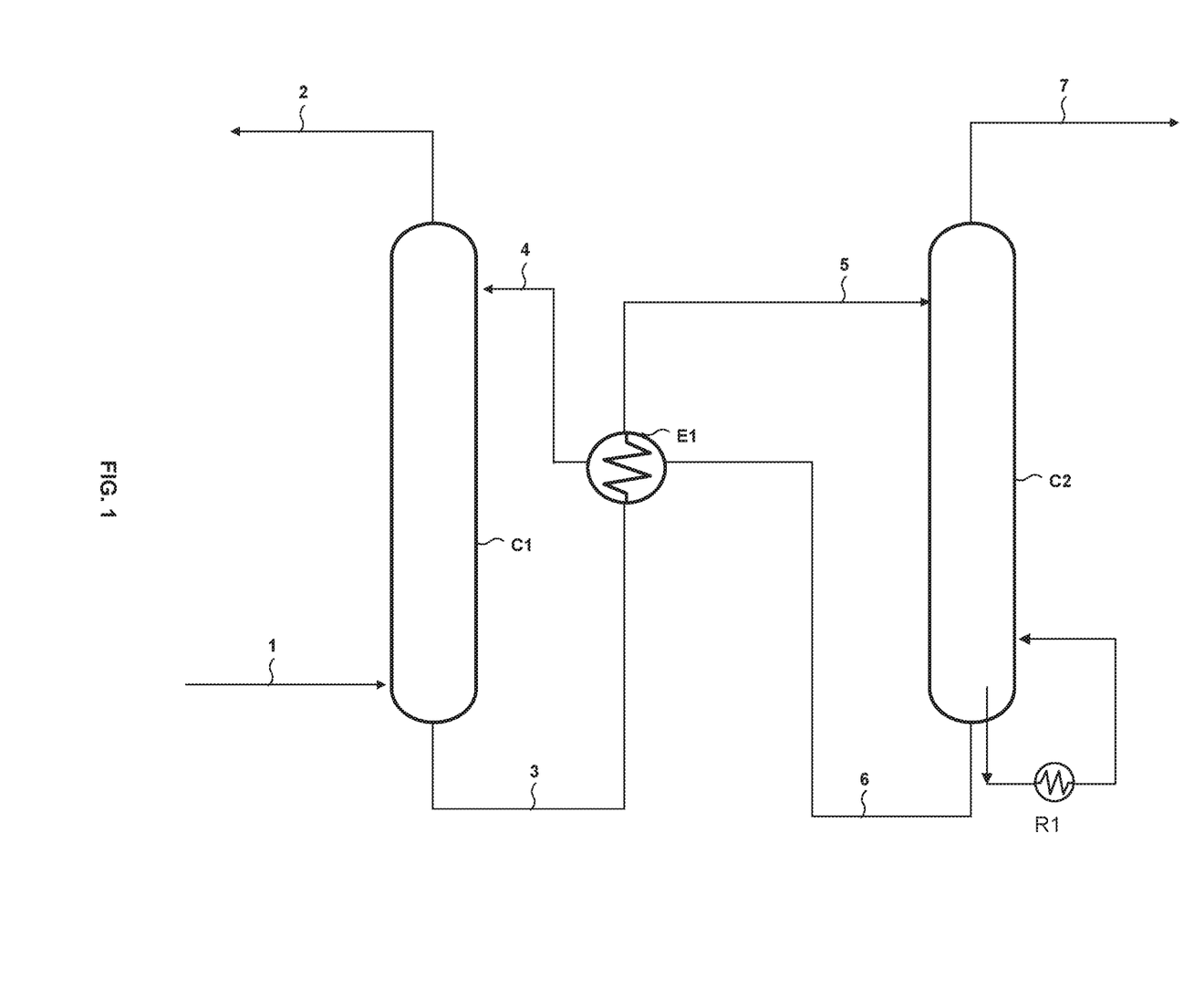
FIG. 1 represents a flow sheet for an embodiment of a process for the treatment of acid gases.

Referring to FIG. 1, the absorption step consists of bringing the gaseous effluent 1 into contact with the absorbing solution 4. The gaseous effluent 1 is introduced into the bottom of the absorption column C1; the absorbing solution is introduced into the head of the column C1. The column C1 is provided with gas/liquid contacting means, for example a loose packing, a structured packing or distillation trays. During contact, the amine functions of the molecules of the absorbing solution react with the acid compounds contained in the effluent in a manner such as to obtain a gaseous effluent which is depleted in acid compounds 2, in particular depleted in $H_2S$ and $CO_2$, and evacuated from the head of the column C1, and an absorbing solution which is enriched in these same acid compounds 3, evacuated from the bottom of the column C1, preferably in order to be regenerated.

The step for selective absorption of $H_2S$ may be carried out at a pressure in the absorption column C1 which is in the range 1 bar to 200 bar, preferably in the range 20 bar to 100 bar, for the treatment of a natural gas, and at a temperature in the absorption column C1 which is in the range 20° C. to 100° C., preferably in the range 30° C. to 90° C., or even in the range 30° C. to 60° C.

The use of a nitrogen-containing compound in accordance with the general formula (I), added to the aqueous solution comprising hindered tertiary or secondary amines in accordance with the invention, means that a selective absorption of $H_2S$ compared with $CO_2$ can be obtained which is greater than that obtained with solutions comprising the same amines without the nitrogen-containing compound having general formula (I). The increase in the dynamic viscosity caused by adding the compound in accordance with the invention has the effect of reducing the absorption of $CO_2$ relative to that of $H_2S$ in a much better manner than when a prior art viscosifying compound is added.

The absorption step may be following by a step for regeneration of the absorbing solution enriched in acid compounds, for example as shown diagrammatically in FIG. 1.

The regeneration step in particular consists of heating and optionally of flashing the absorbing solution enriched in acid compounds in order to liberate the acid compounds in the gaseous form. The absorbing solution enriched in acid compounds 3 is introduced into the heat exchanger E1 where it is heated up by the stream 6 originating from the regeneration column C2. The heated solution 5 leaving the exchanger E1 is introduced into the regeneration column C2.

The regeneration column C2 is equipped with internal means for contact between gas and liquid, for example trays, or loose or structured packings. The bottom of the column C2 is equipped with a reboiler R1 which supplies the heat necessary for regeneration by vaporizing a fraction of the absorbing solution. In the column C2, under the effect of contact of the absorbing solution 5 with the steam produced by the reboiler, the acid compounds are liberated in the gaseous form and evacuated from the head of the column C2 via the conduit 7. The regenerated absorbing solution 6, i.e. depleted in acid compounds, is cooled in the exchanger E1. The cooled solution 4 is then recycled to the absorption column C1.

The regeneration step in the process in accordance with the invention may be carried out by thermal regeneration, optionally supplemented by one or more decompression steps. As an example, the absorbing solution enriched in acid compounds 3 may be sent to a first flash drum (not shown) before it is passed into the heat exchanger E1. In the case of a natural gas, the flash can be used to obtain a gas evacuated at the top of the drum containing the major portion of aliphatic hydrocarbons co-absorbed by the absorbing solution. This gas may optionally be washed with a fraction of the regenerated absorbing solution, and the gas obtained in this manner may be used as a fuel gas. The flash drum is preferably operated at a pressure which is lower than that of the absorption column C1 and higher than that of the regeneration column C2. This pressure is generally fixed by the conditions for use of the fuel gas, and is typically of the order of 5 to 15 bar. The flash drum is operated at a temperature which is substantially identical to that of the absorbing solution obtained at the bottom of the absorption column C1.

The regeneration may be carried out at a pressure in the column C2 which is in the range 1 bar to 5 bar, or even up to 10 bar, and at a temperature in the column C2 which is in the range 100° C. to 180° C., preferably in the range 110° C. to 170° C., more preferably in the range 110° C. to 140° C. Preferably, the regeneration temperature in the regeneration column C2 is in the range 155° C. to 180° C. in the case in which acid gases are to be re-injected. Preferably, the regeneration temperature in the regeneration column C2 is in the range 115° C. to 130° C. in the case in which the acid gas is sent into the atmosphere or to a downstream treatment process, such as a Claus process or a tail gas treatment process.

Advantageously, the process in accordance with the invention may be used to reduce the energy requirements for regeneration of the absorbing solution, in that the improvement in the selectivity reduces the quantity of captured $CO_2$, the heat of absorption of $CO_2$ generally being in the range 50 to 80 kJ/mole.

EXAMPLES

In the following examples, the term "product in accordance with the invention" is used to mean any compound or mixture of compounds in accordance with the invention.

The examples below illustrate, in a non-limiting manner, the synthesis of the compounds in accordance with the invention (Examples 1 to 3) as well as some of the performances of these compounds when they are used in aqueous solution for the selective elimination of $H_2S$ compared with the $CO_2$ contained in a gaseous effluent by bringing the gaseous effluent into contact with the solution.

Example 1

Synthesis of Product A in Accordance with the Invention 17.2 g (0.2 mole) of piperazine was added to a solution of 7.63 g (0.1908 mole) of sodium hydroxide in 200 g of water, then a solution of 17.66 g (0.1909 mole) of epichlorohydrin in 30 g of ethanol was introduced, with stirring, at ambient temperature over 1 hour. The medium was then heated to 100° C. for 2 hours then transferred into an autoclave reactor and heated, with stirring, to a temperature of 140° C. for 2 hours.

Next, the water as well as the ethanol were evaporated off under reduced pressure and the medium was dissolved in 60 g of ethanol. The salt, in suspension, was eliminated by filtration then, after evaporating the solvent off under reduced pressure, 23 g of a highly viscous product A was obtained which had a concentration of amine functions which was estimated to be 14.2 mole/kg of product A. The concentration of amine functions was estimated on the basis of the material balance.

Example 2

Synthesis of Product B in Accordance with the Invention 17.2 g (0.2 mole) of piperazine was added to a solution of 7.63 g (0.1908 mole) of sodium hydroxide in 200 g of water, then a solution of 17.66 g (0.1909 mole) of epichlorohydrin in 30 g of ethanol was introduced, with stirring, at ambient temperature over 1 hour. The medium was then heated to 100° C. for 2 hours then transferred into an autoclave reactor and heated, with stirring, to a temperature of 140° C. for 2 hours.

After cooling to ambient temperature, 6.50 g (0.116 mole) of epoxypropane was introduced and the medium was stirred at ambient temperature for 1 hour. The excess epoxypropane, the water as well as the ethanol were then evaporated off under reduced pressure, then the medium was dissolved in 60 g of ethanol. The salt, in suspension, was eliminated by filtration then, after evaporating the solvent off under reduced pressure, 23.8 g of a highly viscous product B was obtained which had a concentration of amine functions which was estimated to be 13.5 mole/kg of product B. The concentration of amine functions was estimated on the basis of the material balance.

Example 3

Synthesis of Product C in Accordance with the Invention 96.0 g (1.03 mole) of epichlorohydrin was introduced, with stirring at 8° C. over 3 hours, into a solution of 43.0 g (0.5 mole) of piperazine in 320 g of isopropanol. When addition was complete, a white solid precipitated out. The solid was isolated by filtration then dried. 71 g of a white finely divided solid was recovered, which corresponded to the dichlorohydrin of piperazine, N,N'-bis(3-chloro-2-hydroxypropyl) piperazine. 19.0 g of this product was introduced over 10 minutes and at ambient temperature into a reactor containing 5.80 g (1.145 mole) of sodium hydroxide which had been dissolved in 280 g of ethanol and 45 g of water. The medium was then stirred for 2 hours, then 6.2 g (0.072 mole) of piperazine in 80 g of ethanol was introduced over 30 minutes. After 1 hour at ambient temperature, the medium was transferred into an autoclave reactor and heated, with stirring, to a temperature of 140° C. for 2 hours.

The water as well as the ethanol were then evaporated off under reduced pressure and the medium was dissolved in 60 g of ethanol. The salt, in suspension, was eliminated by filtration then, after evaporating the solvent off under reduced pressure, 13.3 g of a highly viscous product C was obtained which had a concentration of amine functions which was estimated to be 12.9 mole/kg of product C. The concentration of amine functions was estimated on the basis of the material balance.

Example 4

Rate of Absorption of $CO_2$ of an Amine Formulation for a Selective Absorption Process Comparative $CO_2$ absorption tests were carried out using various absorbing solutions:
- an aqueous solution of N-methyldiethanolamine (MDEA) in a concentration of 45.75% by weight of MDEA, which constituted a reference absorbing solution for a selective elimination during gas treatment;
- an aqueous solution of MDEA in a concentration of 45.75% by weight, containing 5% by weight of polyethyleneglycol (PEG) with a molecular mass of 35 000 g/mol, which was a viscosifying compound described in the document FR 2 996 464;
- an aqueous solution of MDEA in a concentration of 45.75% by weight, containing 5% by weight of product A in accordance with the invention;
- an aqueous solution of MDEA in a concentration of 45.75% by weight, containing 5% by weight of product C in accordance with the invention.

For each test, the rate of $CO_2$ absorption by the aqueous absorbing solution was measured in a closed reactor of the Lewis cell type. 200 g of solution was introduced into the closed reactor adjusted to a temperature of 45° C. Four successive injections of $CO_2$ of 100 to 200 mbar were carried out into the vapour phase of a reactor with a volume of 200 cm$^3$. The gas phase and the liquid phase were stirred respectively at 100 rpm and at 120 rpm, and were entirely characterized from the hydrodynamic viewpoint. For each injection, the rate of absorption of $CO_2$ was measured by variation of pressure in the gas phase. In this manner, an overall transfer coefficient Kg was measured by a mean of the results obtained for the four injections.

The results are presented in Table 1 below, as the relative rate of absorption with respect to the reference aqueous absorbing solution comprising 45.75% by weight of MDEA. The relative rate of absorption is defined as the ratio of the overall transfer coefficient of the tested absorbing solution to the overall transfer coefficient of the reference absorbing solution (with MDEA).

The dynamic viscosity of the various amine solutions at 45° C. was obtained with the aid of an automatic LOVIS 2000M viscosimeter from Anton Paar, operating in accordance with the Floppier viscosimeter principle. The viscosity was deduced from the measurement of the time for a steel ball to fall in a capillary with a diameter of 1.59 mm (principal range from 1 to 20 mPa·s, extended range from 0.3 to 90 mPa·s) inclined at various angles, in accordance with DIN standard 53015 and ISO standard 12058, as well as the measurement of the density of the amine solutions obtained using an Anton Paar DMA 4100 densimeter at 45° C.

TABLE 1

| Formulation | Concentration of amine (% by wt) | Concentration of amine functions (mol/kg) | Viscosity at 45° C. (mPas) | Relative rate of $CO_2$ absorption at 45° C. |
|---|---|---|---|---|
| MDEA 45.75% by weight (reference) | 45.75 | 3.84 | 3.5 | 1.0 |
| MDEA, 45.75% by weight with 5% by weight of PEG 35000 (in accordance with the document FR2996464) | 45.75 | 3.84 | 17.9 | 0.73 |
| MDEA, 45% by weight with 5% by weight of product A (in accordance with the invention) | 50.75 | 4.55 | 7.4 | 0.69 |
| MDEA, 45.75% by weight with 5% by weight of product C (in accordance with the invention) | 50.75 | 4.49 | 7.8 | 0.67 |

An examination of the results shows, for the formulation in accordance with the invention, a rate of $CO_2$ absorption which was slower than for the reference formulation.

It can also be seen that adding product A or respectively product C to a solution of MDEA containing 45.75% by weight of MDEA reduces the $CO_2$ absorption kinetics by 31%, respectively 33%, as opposed to 27% when adding 5% by weight of PEG 35 000 in accordance with the teaching of the prior art. This result is all the more surprising given that in the case of the formulation in accordance with the prior art, the viscosity is higher and the concentration of amine functions is lower than in the formulation in accordance with the invention.

Thus, it appears that the products A and C exemplified in the invention are astonishingly of particular and improved importance in the case of a selective deacidification of a gaseous effluent in which the absorption kinetics of $CO_2$ are to be limited.

Example 5

$H_2S$ Absorption Capacity for Formulations of MDEA and Product C for a Process for the Treatment of Acid Gases The $H_2S$ absorption capacity performance at 40° C. of an aqueous solution of MDEA and of the product C in accordance with the invention, containing 45.75% by weight of MDEA and 5% by weight of product C, were compared with those of an aqueous solution of MDEA containing 50% by weight of MDEA, which constituted a reference absorbing solution for the deacidification of gas containing $H_2S$.

An absorption test was carried out at 40° C. on aqueous amine solutions in a cell which was equilibrated and thermostatted. This test consisted of injecting into the equilibrated cell, which had already been filled with a degassed aqueous amine solution, a known quantity of acid gas, in this example $H_2S$, then waiting for equilibrium to be reached. The quantities of acid gas absorbed in the aqueous amine solution were then deduced from the temperature and pressure measurements by using material and volume balances. The solubilities were represented, as is conventional, in the form of partial pressures of $H_2S$ (in bar) as a function of the loading level of $H_2S$ (in mol $H_2S$/kg of absorbing solution and in mol of $H_2S$/mol of MDEA).

In the case of deacidification by treating natural gas, the partial pressures of $H_2S$ encountered in the acid gases were typically in the range 0.1 to 1 bar, at a temperature of 40° C. By way of example, on this industrial scale, Table 2 below compares the loading level of $H_2S$ obtained at 40° C. for different partial pressures of $H_2S$ between the 50% by weight MDEA absorbing solution and the absorbing solution in accordance with the invention.

TABLE 2

| | MDEA, 50% by weight (reference) | | MDEA, 45.75% by weight with 5% by weight of product C in accordance with the invention | |
|---|---|---|---|---|
| Formulation Partial pressure of $H_2S$ (bar) | Loading level of $H_2S$ (mol/mol of MDEA) | Loading level of $H_2S$ (mol/kg) | Loading level of $H_2S$ (mol/mol of MDEA) | Loading level of $H_2S$ (mol/kg) |
| 0.1 | 0.21 | 0.88 | 0.23 | 0.90 |
| 0.3 | 0.40 | 1.71 | 0.47 | 1.80 |
| 1 | 0.69 | 2.91 | 0.76 | 2.90 |

At 40° C., for partial pressures of $H_2S$ of 1 bar or less, the absorption capacity of the aqueous solution of MDEA and product A in accordance with the invention was equivalent to or higher than that of the reference solution of MDEA.

Thus, it can be seen that the absorbing solution in accordance with the invention has an $H_2S$ absorption capacity which is equivalent to or higher than the reference aqueous solution of MDEA in the range of partial pressures of $H_2S$ in the range 0.1 to 1 bar, corresponding to a range of partial pressures representative of the usual industrial conditions.

As illustrated in the preceding example, the absorption of $CO_2$ is slower in the aqueous solution in accordance with the invention than in a reference aqueous solution of MDEA. In addition, the $H_2S$ absorption capacity for the absorbing solutions in accordance with the invention compared with reference MDEA solutions is equivalent to or higher for a partial pressure of $H_2S$ of 0.1-1 bar, as illustrated in the present example Thus, it appears that the product exemplified in the invention is of particular importance in improving the $H_2S$ absorption selectivity compared with $CO_2$ and in reducing the flow rates of absorbing solution to be employed in selective deacidification applications ($H_2S$ as opposed to $CO_2$), i.e. of absorbing a given flow rate of $H_2S$ while reducing the flow rate of co-absorbed $CO_2$ compared with the reference MDEA absorbing solution.

The invention claimed is:

1. A process for selectively removing $H_2S$ with respect to $CO_2$ from a gaseous effluent comprising $H_2S$ and $CO_2$, in which a step of absorption of the acid compounds is carried out by bringing the gaseous effluent into contact with an absorbent solution comprising:

(a) water,
(b) at least one main nitrogenous compound comprising at least one tertiary amine function or one secondary amine function comprising two secondary carbons in the α and α' positions with respect to the nitrogen atom or at least one tertiary carbon in the alpha or beta position with respect to the nitrogen atom, and
(c) at least one secondary nitrogenous compound belonging to a polyamine family, resulting from the reaction between piperazine and an epihalohydrin or a 1,3-dihalo-2-propanol, and corresponding to formula (I):

(I)

in which:
n is between 2 and 100,
each $R_1$ is independently a hydrogen atom or an alkyl radical comprising between 1 and 8 carbon atoms or a hydroxyalkyl radical corresponding to formula (II):

(II)

in which:
each $R_2$ is independently a hydrogen atom or an alkyl radical comprising between 1 and 6 carbon atoms,
two $R_2$ radicals may be linked to one another by a covalent bond so as to form a ring when said two $R_2$ radicals are alkyl radicals comprising between 1 and 6 carbon atoms.

2. The process for selectively removing $H_2S$ with respect to $CO_2$ according to claim 1, in which all $R_1$ hydrogen atoms.

3. The process for selectively removing $H_2S$ with respect to $CO_2$ according to claim 1, in which all $R_1$ are hydroxyalkyl radicals corresponding to formula (II), and in which at least three $R_2$ radicals are hydrogen atoms.

4. The process for selectively removing $H_2S$ with respect to $CO_2$ according to claim 1, in which the secondary nitrogenous compound is obtained by a synthesis process comprising a polycondensation reaction between piperazine of formula (III) and an epihalohydrin of formula (IV) or a 1,3-dihalo-2-propanol of formula (XI) to form at least one compound of formula (I) in which $R_1$ is a hydrogen atom, which is identified as formula V (III)

(IV)

(XI)

(V)

X is a halogen atom in formulae (IV) and (XI).

5. The process for selectively removing $H_2S$ with respect to $CO_2$ according to claim 4, in which the epihalohydrin of formula (IV) is epichlorohydrin, and the 1,3-dihalo-2-propanol of formula (XI) is 1,3-dichloro-2-propanol.

6. The process for selectively removing $H_2S$ with respect to $CO_2$ according to claim 4, in which a base neutralizes the hydrohalic acid produced during the polycondensation reaction between piperazine and the epihalohydrin of formula (IV) or the 1,3-dihalo-2-propanol of formula (XI) by forming a salt.

7. The process for selectively removing $H_2S$ with respect to $CO_2$ according to claim 6, in which the base is sodium hydroxide or potassium hydroxide, and/or said salt is removed by washing or by filtration.

8. The process for selectively removing $H_2S$ with respect to $CO_2$ according to claim 4, in which the polycondensation reaction is carried out between ambient temperature and 140° C.

9. The process for selectively removing $H_2S$ with respect to $CO_2$ according to claim 4, in which the polycondensation reaction is carried out in the presence of a solvent or a solvent mixture, said solvent being selected from the group consisting of water, alcohols and ethers.

10. The process for selectively removing $H_2S$ with respect to $CO_2$ according to claim 9, in which said alcohol is methanol, ethanol or isopropanol, and said ether is tetrahydrofuran, 1,4-dioxane or diglyme.

11. The process for selectively removing $H_2S$ with respect to $CO_2$ according to claim 4, in which the piperazine is in molar excess relative to the epihalohydrin of general formula (IV) or to the 1,3-dihalo-2-propanol of formula (XI).

12. The process for selectively removing $H_2S$ with respect to $CO_2$ according to claim 4, in which the epihalohydrin of formula (IV) or said 1,3-dihalo-2-propanol of (XI) is in molar excess relative to the piperazine, and in which the polycondensation reaction is carried out in the presence of a mono-N-substituted piperazine compound of formula (XII), (XII)

with a combination formed by the piperazine and the mono-N-substituted piperazine compound being in molar excess relative to the epihalohydrin or to the 1,3-dihalo-2-propanol.

13. The process for selectively removing $H_2S$ with respect to $CO_2$ according to claim 1, in which the secondary nitrogenous compound is obtained by a synthesis process comprising the following reactions:
a first polycondensation reaction between the piperazine of formula (III) and an epihalohydrin of formula (IV) or a 1,3-dihalo-2-propanol of formula (XI) to form at least one compound of formula (I) in which $R_1$ is a hydrogen atom, which is identified as formula V, X is a halogen atom in formulae (IV) and (XI),
a second reaction of addition or condensation of a compound of formula (V) with a third reagent to produce a compound according to formula (I) in which $R_1$ is an alkyl radical comprising between 1 and 8 carbon atoms or a hydroxyalkyl radical corresponding to formula (II).

14. The process for selectively removing $H_2S$ with respect to $CO_2$ according to claim 13, in which the second reaction is carried out between a compound of formula (V) and an epoxide to produce a compound according to formula (I) in which $R_1$ is a hydroxyalkyl radical corresponding to formula (II).

15. The process for selectively removing $H_2S$ with respect to $CO_2$ according to claim 13, in which the second reaction is a condensation or addition reaction providing N-alkylation of a compound of formula (V) to produce a compound according to formula (I) in which $R_1$ is an alkyl radical comprising between 1 and 8 carbon atoms.

16. The process for selectively removing $H_2S$ with respect to $CO_2$ according to claim 1, in which the absorbent solution comprises:
a mass fraction of water of between 3.5% and 94.5% by weight of the absorbent solution,
a mass fraction of the main nitrogenous compound of between 5% and 95% by weight of the absorbent solution,
a mass fraction of the secondary nitrogenous compound of between 0.5% and 25% by weight of the absorbent solution,
the mass fraction of the main nitrogenous compound being greater than that of the secondary nitrogenous compound.

17. The process for selectively removing $H_2S$ with respect to $CO_2$ according to claim 16, in which
the mass fraction of water is between 39.5% and 79.5% by weight of the absorbent solution,
the mass fraction of the main nitrogenous compound is between 20% and 60% by weight of the absorbent solution, or
the mass fraction of the secondary nitrogenous compound is between 1% and 10% by weight of the absorbent solution.

18. The process for selectively removing $H_2S$ with respect to $CO_2$ according to claim 1, in which the main nitrogenous compound is selected from the group consisting of:
N-methyldiethanolamine;
triethanolamine;
diethylmonoethanolamine;
dimethylmonoethanolamine;
ethyldiethanolamine;
tertiary monoalkanolamines of a 3-alkoxypropylamine family selected from the group consisting of N-methyl-N-(3-methoxypropyl)-2-aminoethanol, N-methyl-N-(3-methoxypropyl)-1-amino-2-propanol, N-methyl-N-(3-methoxypropyl)-1-amino-2-butanol, N-ethyl-N-(3-methoxypropyl)-2-aminoethanol, N-ethyl-N-(3-methoxypropyl)-1-amino-2-propanol, N-ethyl-N-(3-methoxypropyl)-1-amino-2-butanol, N-isopropyl-N-(3-methoxypropyl)-2-aminoethanol, N-isopropyl-N-(3-methoxypropyl)-1-amino-2-propanol and N-isopropyl-N-(3-methoxypropyl)-1-amino-2-butanol;
diamines selected from the group consisting of 1,2-bis(2-dimethylaminoethoxy)ethane, 1,2-bis(2-diethylaminoethoxy)ethane and 1,2-bis(2-pyrolidinoethoxy)ethane;
diamines of a 1,3-diamino-2-propanol family selected from the group consisting of 1,3-bis(dimethylamino)-2-propanol, (1-dimethylamino-3-tert-butyl amino)-2-propanol, 1,3 bis(tert-butylamino)-2-propanol, 1,3-bis(diethylamino)-2-propanol, 1,3-bis(methylamino)-2-propanol, 1,3-bis(ethylmethylamino)-2-propanol, 1,3-bis(n-propylamino)-2-propanol, 1,3-bis(isopropylamino)-2-propanol, 1,3-bis(n-butylamino)-2-propanol, 1,3-bis(isobutylamino)-2-propanol, 1,3-bis(piperidino)-2-propanol, 1,3-bis(pyrrolidino)-2-propanol and N,N,N'-trimethyl-N'-hydroxyethyl-1,3-diamino-2-propanol;
dihydroxyalkylamines selected from the group consisting of N-(2'-hydroxyethyl)-2-amino-2-methyl-1-propanol, N-(2'-hydroxypropyl)-2-amino-2-methyl-1-propanol, N-(2'-hydroxybutyl)-2-amino-2-methyl-1-propanol and (N-methyl-N-hydroxyethyl)-3-amino-2-butanol;
diamines of a bis(amino-3-propyl)ether or (amino-2-ethyl)-(amino-3-propyl)ethers family selected from the group consisting of bis(dimethylamino-3-propyl)ether, bis(diethylamino-3-propyl)-ether, (dimethylamino-2-ethyl)-(dimethylamino-3-propyl)ether, (diethylamino-2-ethyl)-(dimethylamino-3-propyl) ether, (dimethylamino-2-ethyl)-(diethylamino-3-propyl) ether and (diethylamino-2-ethyl)-(diethylamino-3-propyl) ether;
beta-hydroxylated tertiary diamines selected from the group consisting of 1-dimethylamino-3-(2-dimethylaminoethoxy)-2-propanol, 1,1'-oxybis[3-(dimethylamino)-2-propanol], N,N,N',N'-(tetramethyl)-1, 6-diamino-2,5-hexanediol, N,N,N',N'-(tetramethyl)-1,7-diamino-2,6-heptanediol, N,N,N',N'-(tetramethyl)-1,8-diamino-2,7-octanediol, N,N,N',N'-(tetramethyl)-1,9-diamino-2, 8-nonanediol and N,N,N',N'-(tetramethyl)-1,10-diamino-2,9-decanediol;
di(2-hydroxyalkyl)monoamines selected from the group consisting of 1-[(2-hydroxyethyl)methylamino]-2-methyl-2-propanol, 1,1'-(methylimino)bis[2-methyl-2-propanol], 2-[(2-hydroxy-2-methylpropyl)amino]-2-methyl-1-propanol, 2-[2-hydroxy-2-methylpropyl)amino]-1-butanol and bis(2-hydroxy-2-methylpropyl)amine;
hindered tertiary 4-(aminoethyl)-morpholines selected from the group consisting of 1-(4-morpholino)-2-(methylisopropylamino)ethane, 1-(4-morpholino)-2-

(methyltert-butylamino)-ethane, 1-(4-morpholino)-2-(diisopropylamino)ethane and 1-(4-morpholino)-2-(1-piperidinyl)-ethane;

diamines selected from the group consisting of (N-morpholinoethyl)isopropylamine, (N-piperidinoethyl)isopropylamine and (N-morpholinoethyl)-tert-butylamine;

amines of a N-alkyl-3-hydroxypiperidine or N-alkyl-4-hydroxypiperidine family selected from the group consisting of N-methyl-4-hydroxypiperidine, N-ethyl-3-hydroxypiperidine and N-methyl-3-hydroxypiperidine; and alkylaminopiperazines selected from the group consisting of 1-methyl-4-(3-dimethylaminopropyl)piperazine and 1-ethyl-4-(diethylaminoethyl)piperazine.

19. The process for selectively removing $H_2S$ with respect to $CO_2$ according to claim 1, in which the absorbent solution also comprises a physical solvent selected from the group consisting of methanol, ethanol, 2-ethoxyethanol, benzyl alcohol, triethylene glycol dimethyl ether, tetraethylene glycol dimethyl ether, pentaethylene glycol dimethyl ether, hexaethylene glycol dimethyl ether, heptaethylene glycol dimethyl ether, octaethylene glycol dimethyl ether, diethylene glycol butoxyacetate, glyceryl triacetate, sulfolane, N-methylpyrrolidone, N-methylmorpholin-3-one, N,N-dimethylformamide, N-formylmorpholine, N,N-dimethylimidazolidin-2-one, N-methylimidazole, ethylene glycol, diethylene glycol, triethylene glycol, thiodiglycol, tributyl phosphate and propylene carbonate.

20. The process for selectively removing $H_2S$ with respect to $CO_2$ according to claim 1, in which the gas effluent is selected from the group consisting of natural gas, synthesis gases, refinery gases, acid gases resulting from an amine unit, gases resulting from a tail gas reduction unit of a Claus process, and biomass fermentation gases.

* * * * *